No. 810,575. PATENTED JAN. 23, 1906.
A. SHEARER.
COMBINED LISTER PLOW AND PLANTER.
APPLICATION FILED OCT. 9, 1903.
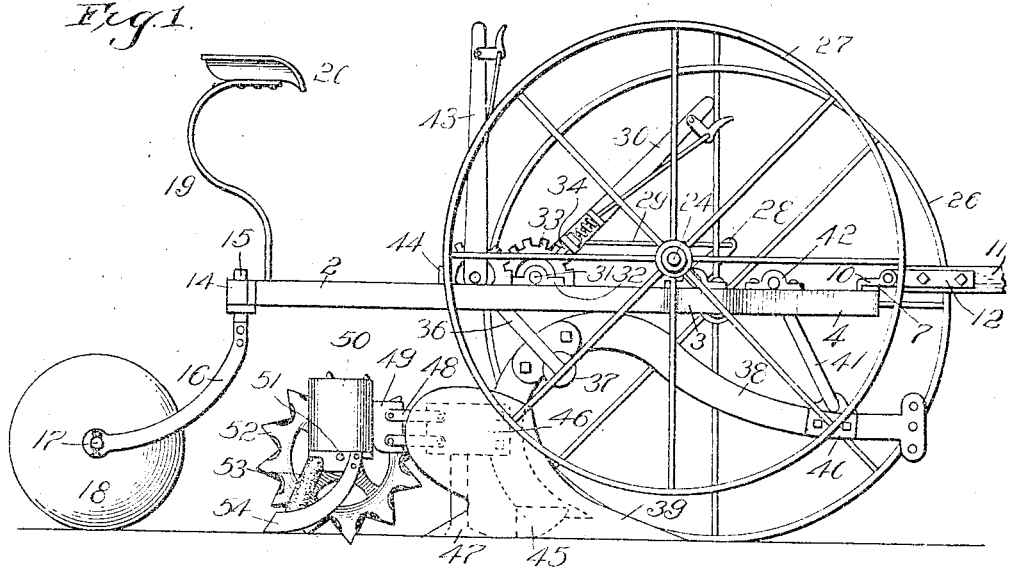
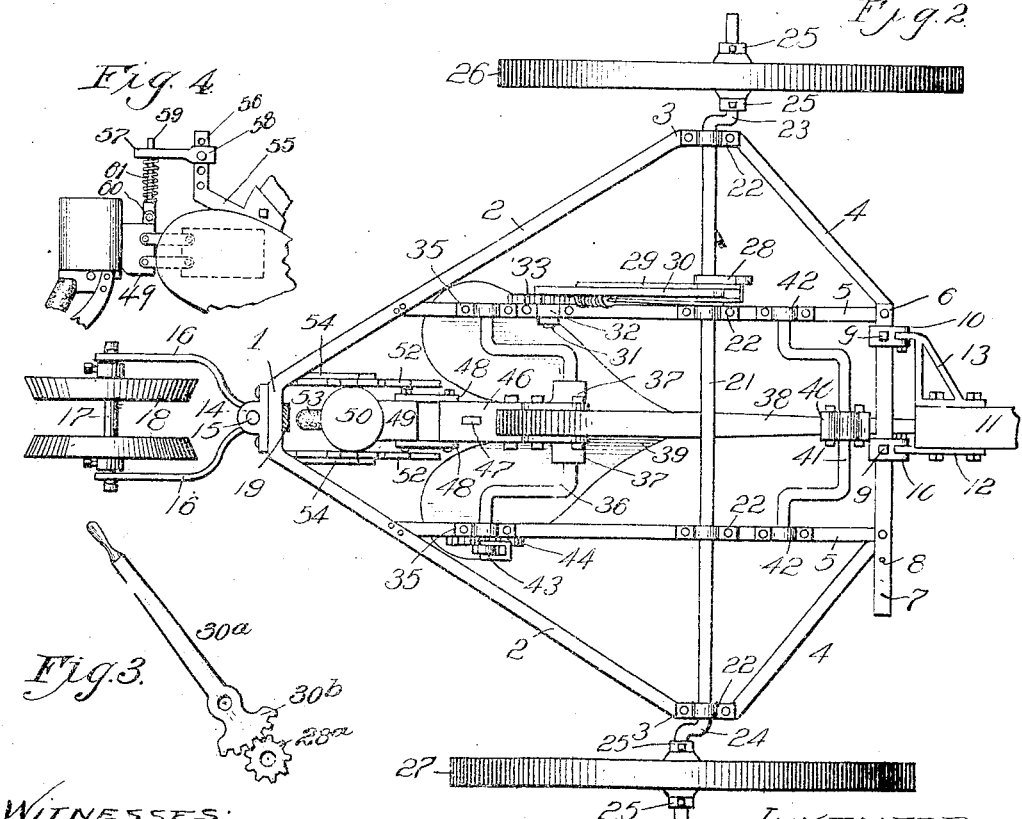
WITNESSES:
A. McArthur
Frank Glow
INVENTOR:
ANDREW SHEARER
By George J. Thorpe
ATTY.

UNITED STATES PATENT OFFICE.

ANDREW SHEARER, OF FRANKFORT, KANSAS, ASSIGNOR OF ONE-HALF TO LINDEN KIRLIN, OF KANSAS CITY, MISSOURI.

COMBINED LISTER-PLOW AND PLANTER.

No. 810,575.     Specification of Letters Patent.     Patented Jan. 23, 1906.

Application filed October 8, 1903. Serial No. 176,365.

*To all whom it may concern:*

Be it known that I, ANDREW SHEARER, a citizen of the United States, residing at Frankfort, in the county of Marshall and State of Kansas, have invented certain new and useful Improvements in a Combined Lister-Plow and Planter, of which the following is a specification.

My invention relates to combined lister-plows and planters; and my object is to produce a simple, safe, and efficient riding-lister for the purpose of planting corn and other grain in rows in bottom of furrow.

The special object of my invention is to produce a machine whereby the person in control is enabled to accurately gage the width or distance apart of rows. To effect such object, a wide-track machine is necessary, the front wheels alternately running in the last-made furrow as the machine is driven back and forth across the field.

A further object of my invention is to enable the operator to run one front wheel and the rear or caster wheel always in the smooth furrow for the purpose of overcoming the jolting or unsteady motion of the machine consequent on both front wheels running on rough ground.

A still further object is to provide a machine that will not upset, which will be safe and comfortable for the driver, and which can be easily managed by an inexperienced person.

A further object is to produce a machine by which the seed can be planted and covered at a uniform and any desired depth and having seeding mechanism of such character that it can be disposed to permit the caster to be swung completely around, and therefore enable the driver to back up and turn at the ends of rows with ease and safety.

To emphasize the advantage of a broad-gage lister and planter, it should be stated that the standard distance between listed corn-rows is three feet six inches, whereas the old-style lister cannot be worked with its wheels more than three feet two inches apart. As a consequence while a furrow is being made one wheel must run on the side of the ridge of the last-made furrow, such travel being attended by a jolting uncomfortable to the driver and the cause of irregular planting of the seed. Furthermore, the machine is very unstable and overturns easily.

With the objects named in view the invention consists in certain novel and peculiar features of construction and organization, as hereinafter described and claimed, and in order that it may be fully understood reference is to be had to the accompanying drawings, in which—

Figure 1 is a side elevation of a combined lister-plow and planter embodying my invention. Fig. 2 is a top plan view of the same. Fig. 3 is a modification of the lever and crank-shaft connection, and Fig. 4 is an elevation showing lister and drill attachment for working gumbo or hard ground.

In the said drawings the frame of the machine is shown as composed of a bar bent to form a short transverse rear portion 1, the forwardly-diverging arms 2, the short longitudinal side portions 3, the forwardly-converging arms 4, and the inner longitudinal portions 5, secured at their rear ends to portions 2 in any suitable manner.

6 designates a cross-bar connecting the front ends of the frame and of greater length than the connected portion of the latter, so as to provide a side extension 7, and said bar is provided with a series of apertures 8, through certain of which bolts 9 extend for the purpose of securing to the bar the hinge members 10, the tongue 11 being provided with the companion hinge members in the form of plate 12 and bracket 13. As arranged in Fig. 2 the machine is adapted for use with two or four horses. It will be readily seen that by removing bolts 9, moving the tongue laterally, and then securing it in its new position by means of said bolts provision can be made for the use of three horses.

Secured to the rear portion 1 of the frame is a bearing 14 for the caster-frame, comprising the cylindrical stem 15 and the curved fork 16, a shaft 17 being journaled in said fork and equipped with a caster, preferably in the form of a double wheel 18, each section of which is adjustable on the shaft as to distance apart and has its tread-surface tapering inwardly. This double wheel not only performs the usual function of a caster, but also by reason of the peculiarity of its tread-surface tends to centralize the machine and to force the loose soil over the seed deposited by mechanism hereinafter referred to and to pack it lightly at each side thereof. When the ground is dry, the sections can be run close together and press the soil firmly onto the seed, as the dirt will not adhere to the wheels. When the ground is wet and sticky, the sections can be set wider apart.

19 is the spring which supports seat 20 and is secured to portion 1 of the frame, and 21 is the transverse shaft or axle journaled in bearings 22, secured upon portions 3 and 5 of the frame, said shaft being provided at its opposite ends with cranks 23 24, which project, by preference, in opposite directions, but which may extend at an angle to each other, if desired, and secured at the desired point on the horizontal portion of crank 23 by means of adjustable collars 25 is a wheel 26, a similar wheel 27 being mounted on the horizontal portion of crank 24 and held at the desired point by means of similar collars 25. By making provision for the lateral adjustment of the collars it is obvious that the distance between the rows can be readily determined and controlled by simply disposing the wheels the desired distance apart and then running one wheel in the last-made furrow. The travel of said wheel in the last-made furrow also insures parallelism of the rows, it being understood, of course, that the wheel which operates in the furrow (shown as 26 in this instance) must occupy a lower plane than the companion wheel, which runs upon the unbroken ground, this result being accomplished by the proper adjustment of the crank shaft or axle, as shown clearly in the drawings. The wheels are disposed about twice as far apart as those of the usual planter with the object of producing a machine which will not upset and which will run easier, and therefore plant at more uniform distances apart with greater comfort to the driver and with less draft on the horses.

The crank shaft or axle is provided with a crank-arm 28, which projects forward and upward at an angle of about forty-five degrees when wheel 26 is depressed for operation in the furrows, and said crank-arm is pivotally connected by a link 29 with a lever 30, secured upon a short shaft 31 of a bearing 32 on the frame, a notched sector 33 being secured to the frame and adapted for engagement by the usual spring-actuated dog 34, carried by lever 30, such engagement locking the crank shaft or axle with the wheels 26 and 27 in the desired relation. If preferred, in lieu of the crank-arm 28 and lever 30 I may equip the axle with a cog-wheel 28$^a$ and mount on the frame a lever 30$^a$, formed with a toothed segment 30$^b$, engaging said cog-wheel, (see Fig. 3,) said lever being provided with suitable devices (not shown) to lock the axle against accidental rotation.

35 designates bearings secured, preferably, to parts 5 of the frame and forming journals for the crank shaft or bail 36, the central portion of the same being journaled in the lugs 37, bolted to the beam 38 of the double-moldboard lister-plow 39, the front end of the beam being also equipped with a bracket 40 for engagement by the depending crank shaft or bail 41, having its ends journaled in bearings 42, secured to parts 5 of the frame. These two supporting-bails, while maintaining the plow in approximately a horizontal plane, permit it to play vertically to a limited extent or to be elevated to inoperative position when desired through the medium of the lever 43, mounted upon one end of crank shaft or bail 36 and provided with the usual catch for engagement with sector 44 to lock the lever in the desired position.

The lower end of the plow-beam is equipped with the usual cutter 45 (shown only in dotted lines) and above the same with a rearwardly-projecting block 46, carrying a common subsoiler 47, the cutter and subsoiler being in common use and well known. The block 46 is pivotally connected by links 48 to the block 49, secured to or forming a part of the seedbox 50. The shaft 51, adapted to be geared in such a manner as when turned to effect the dropping of seed from the seedbox at proper intervals, a common and well-known construction, is equipped with starwheels 52 at its ends, said star-wheels by the successive engagement of their points with the ground serving to impart the necessary rotation to shaft 51 for dropping the seed in the usual manner through the seed-spout 53, coverers 54, depending from the seedbox, forcing the loose earth over the seed, which earth is subsequently packed lightly by means of the trailing caster, as hereinbefore explained.

In the practical operation of the machine it will be apparent that the vertical play of the lister-plow takes place without interfering with the proper operation of the seed mechanism because of the link connection between blocks 46 and 49, it being obvious that when the plow is raised to inoperative position the seeding mechanism is also elevated, and in this connection it should be stated that said parts can be elevated sufficiently high and moved far enough forward to permit the caster-wheel to turn clear around under the drill, this being necessary to permit backing of the machine while turning at the end of the row.

For working in gumbo or very hard ground the lister is equipped with a bracket 55, provided with a vertical series of holes 56, and an adjustable arm 57, slidable thereon and adapted to be secured at the desired point of adjustment by a pin or bolt 58, extending through the arm and one of said holes. The opposite end of said arm fits slidingly on rod 59, pivotally secured, by preference, to the block 49, as at 60, and equipped with a helical expansion-spring 61, which bears at its opposite ends against the said rod and the under side of said arm, the pressure of the said spring upon the drill being varied by proper adjustment of arm 57 on rod 59.

By the provision of a machine equipped with cranks set at an angle to each other with the wheels mounted thereon the operator is enabled to simultaneously reverse the position of the wheels at the end of a trip across the field preliminary to his return to the opposite side of the field—that is to say, he respectively raises and lowers the wheels which in the trip last completed traveled in the furrow and on the unbroken ground, so that on the return trip the wheel formerly in the furrow will travel on the unbroken ground and the other wheel in the furrow. This construction with the addition of the plow set midway between the wheels and the latter twice as far apart as contiguous rows less the width of the bottom of the furrow insures parallelism of and equal distance between all of the rows provided the machine is operated with one of said wheels in the last-made furrow. It furthermore provides a machine by which said rows shall bear the relation to each other stated even though the driver is inexperienced and unskilful, as all the latter has to do is to keep one wheel in the last-made furrow. It will furthermore be noted that the comparatively great distance between the wheels makes it practically impossible for the machine to be overturned and, furthermore, reduces the jolting to the minimum.

From the above description it will be apparent that I have produced a combined lister-plow and planter which, in addition to the various features of advantage enumerated, is of simple, strong, and durable construction, and while I have illustrated and described the preferred embodiment of the invention it is to be understood that it is susceptible of variation in the form, proportion, detail construction, and arrangement of the parts without departing from its essential spirit and scope or sacrificing any of its advantages.

Having thus described the invention, what I claim as new, and desire to secure by Letters Patent, is—

1. In a machine of the character described, a suitable frame, a lister-plow suspended therefrom, means to raise and lower the plow, a transverse axle journaled in the frame and provided at its ends with rigid cranks extending at an angle to each other, wheels journaled on said cranks at approximately equal distances from and at opposite sides of the plow, a caster supporting the rear end of the frame and disposed in line with the plow, and means to rotate said axle and thereby simultaneously raise one and lower the other of its wheels without affecting the level of the plow.

2. In a machine of the character described, a suitable frame, a lister-plow suspended therefrom, means to raise and lower the plow, a planting mechanism suitably supported in longitudinal alinement with and rearward of the plow, a transverse axle journaled in the frame and provided at its ends with rigid cranks extending at an angle to each other, wheels journaled on said cranks at approximately equal distances from and at opposite sides of the plow, a caster supporting the rear end of the frame and disposed in line with the plow, and means to rotate said axle and thereby simultaneously raise one and lower the other of its wheels without affecting the level of the plow.

3. In a machine of the character described, a suitable frame, a transverse axle journaled therein and provided with cranks extending at an angle to each other, wheels journaled on said cranks and adjustable thereon laterally of the frame, a tongue hinged to the front portion of the frame, and a caster supporting the rear end of the frame.

4. In a machine of the character described, a suitable frame, a transverse axle journaled therein and provided with cranks extending at an angle to each other, wheels journaled on said cranks and adjustable thereon laterally of the frame, collars mounted on said cranks at opposite sides of each wheel, and adjustable laterally of the frame, to vary the distance between the wheels, a tongue hinged to the front portion of the frame, and a caster supporting the rear end of the frame.

In testimony whereof I affix my signature in the presence of two witnesses.

ANDREW SHEARER.

Witnesses:
GEO. B. HELCKER,
E. F. AHERN.